US010503978B2

(12) United States Patent
Kadav et al.

(10) Patent No.: US 10,503,978 B2
(45) Date of Patent: Dec. 10, 2019

(54) SPATIO-TEMPORAL INTERACTION NETWORK FOR LEARNING OBJECT INTERACTIONS

(71) Applicant: NEC Laboratories America, Inc., Princeton, NJ (US)

(72) Inventors: Asim Kadav, Jersey City, NJ (US); Chih-Yao Ma, Marietta, GA (US); Iain Melvin, Hopewell, NJ (US); Hans Peter Graf, South Amboy, NJ (US)

(73) Assignee: NEC Corporation (JP)

( * ) Notice: Subject to any disclaimer, the term of this patent is extended or adjusted under 35 U.S.C. 154(b) by 74 days.

(21) Appl. No.: 15/978,738

(22) Filed: May 14, 2018

(65) Prior Publication Data

US 2019/0019037 A1    Jan. 17, 2019

Related U.S. Application Data

(60) Provisional application No. 62/576,264, filed on Oct. 24, 2017, provisional application No. 62/532,499, filed on Jul. 14, 2017.

(51) Int. Cl.
   *G06K 9/00* (2006.01)
   *G06K 9/68* (2006.01)
   *G06K 9/62* (2006.01)

(52) U.S. Cl.
   CPC ..... *G06K 9/00744* (2013.01); *G06K 9/00718* (2013.01); *G06K 9/6262* (2013.01); *G06K 9/6857* (2013.01)

(58) Field of Classification Search
   CPC ............ G06K 9/00744; G06K 9/6262; G06K 9/6857; G06K 9/00718
   See application file for complete search history.

(56) References Cited

PUBLICATIONS

Zhao, Bo, et al. "Diversified visual attention networks for fine-grained object classification." IEEE Transactions on Multimedia 19.6 (2017): 1245-1256. (Year: 2017).*
Ni, Bingbing, Xiaokang Yang, and Shenghua Gao. "Progressively parsing interactional objects for fine grained action detection." Proceedings of the IEEE Conference on Computer Vision and Pattern Recognition. 2016. (Year: 2016).*
Ni, "Progressively Parsing Interactional Objects for Fine Grained Action Detection", IEEE Conference on Computer Vision and Pattern Recognition, Jun. 2016, pp. 1020-1028.

(Continued)

*Primary Examiner* — Menatoallah Youssef
(74) *Attorney, Agent, or Firm* — Joseph Kolodka

(57) ABSTRACT

Systems and methods for improving video understanding tasks based on higher-order object interactions (HOIs) between object features are provided. A plurality of frames of a video are obtained. A coarse-grained feature representation is generated by generating an image feature for each of for each of a plurality of timesteps respectively corresponding to each of the frames and performing attention based on the image features. A fine-grained feature representation is generated by generating an object feature for each of the plurality of timesteps and generating the HOIs between the object features. The coarse-grained and the fine-grained feature representations are concatenated to generate a concatenated feature representation.

20 Claims, 6 Drawing Sheets

(56) References Cited

PUBLICATIONS

Lea, "Segmental Spatiotemporal CNNs for Fine-grained Action Segmentation", European Conference on Computer Vision, Sep. 2016, pp. 36-52.
Chao, "Learning to Detect Human-Object Interactions", arXiv:1702.05448v2, Mar. 2018, pp. 1-10.
Gkioxari, "Detecting and Recognizing Human Object Interactions" arXiv:1704.07333v3, Mar. 2018, pp. 1-10.
Ni, "Multiple Granularity Analysis for Fine-Grained Action Detection", Conference on Computer Vision and Pattern Recognition, Jun. 2014, pp. 756-763.
Li, "Scene Graph Generation from Objects, Phrases and Region Captions", ICCV, Jul. 2017, pp. 1-10.
Johnson, "Image Retrieval Using Scene Graphs", IEEE Conference on Computer Vision and Pattern Recognition, Jun. 2015, pp. 1-11.
Bo Zhao et al, "Diversified Visual Attention Networks for Fine-Grained Object Classification", IEEE Transactions on Multimedia, Jan. 2017 (See pp. 1, 3, 7-8; and figure 2).
Ashish Vaswani et al., "Attention is All You Need", arXiv.org Jun. 2017 (See pp. 3-4).

\* cited by examiner

SPATIO-TEMPORAL INTERACTION NETWORK FOR LEARNING OBJECT INTERACTIONS

RELATED APPLICATION INFORMATION

This application claims priority to U.S. Provisional Patent Application No. 62/532,499, filed on Jul. 14, 2017, and U.S. Provisional Patent Application No. 62/576,264, filed on Oct. 24, 2017, 2017, both incorporated by reference herein in their entirety.

BACKGROUND

Technical Field

The present invention relates to machine learning, and more particularly to learning of object interactions.

Description of the Related Art

Video understanding tasks, such as action recognition, video captioning, video question-answering, etc., can be useful for various applications, such as surveillance, video retrieval, human behavior understanding, etc. Actions or activity displayed within a video can involve complex interactions across several inter-related objects in a scene. Learning interactions across multiple objects from a large number of frames of a video for action recognition (e.g., human action recognition) can be computationally infeasible and performance can suffer due to a large combinatorial space that has to be modeled.

SUMMARY

According to an aspect of the present principles, a computer-implemented method is provided for improving video understanding tasks based on higher-order object interactions (HOIs) between object features. The method includes obtaining a plurality of frames of a video, generating a coarse-grained feature representation and generating a fine-grained feature representation. Generating the coarse-grained feature representation includes generating an image feature for each of a plurality of timesteps respectively corresponding to each of the frames and performing attention based on the image features. Generating the fine-grained feature representation includes generating an object feature for each of the plurality of timesteps and generating the HOIs between the object features. The method further includes concatenating the coarse-grained and the fine-grained feature representations to generate a concatenated feature representation.

According to another aspect of the present principles, a computer program product having program instructions embodied therewith is provided. The program instructions are executable by a computer to cause the computer to perform a method for improving video understanding tasks based on higher-order object interactions (HOIs) between object features. The method includes obtaining a plurality of frames of a video, generating a coarse-grained feature representation and generating a fine-grained feature representation. Generating the coarse-grained feature representation includes generating an image feature for a plurality of timesteps respectively corresponding to each of the frames and performing attention based on the image features. Generating the fine-grained feature representation includes generating an object feature for each of the plurality of timesteps and generating the HOIs between the object features. The method further includes concatenating the coarse-grained and the fine-grained feature representations to generate a concatenated feature representation.

According to another aspect of the present principles, a system is provided for improving video understanding tasks based on higher-order object interactions (HOIs) between object features. The system includes at least one processor operatively coupled to a memory. The at least one processor is configured to obtain a plurality of frames of a video, generate a coarse-grained feature representation by generating an image feature for a plurality of timesteps respectively corresponding to each of the frames and performing attention based on the image features, generate a fine-grained feature representation by generating an object feature for each of the plurality of timesteps and generating the HOIs between the object features, and concatenate the coarse-grained and the fine-grained feature representations to generate a concatenated feature representation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
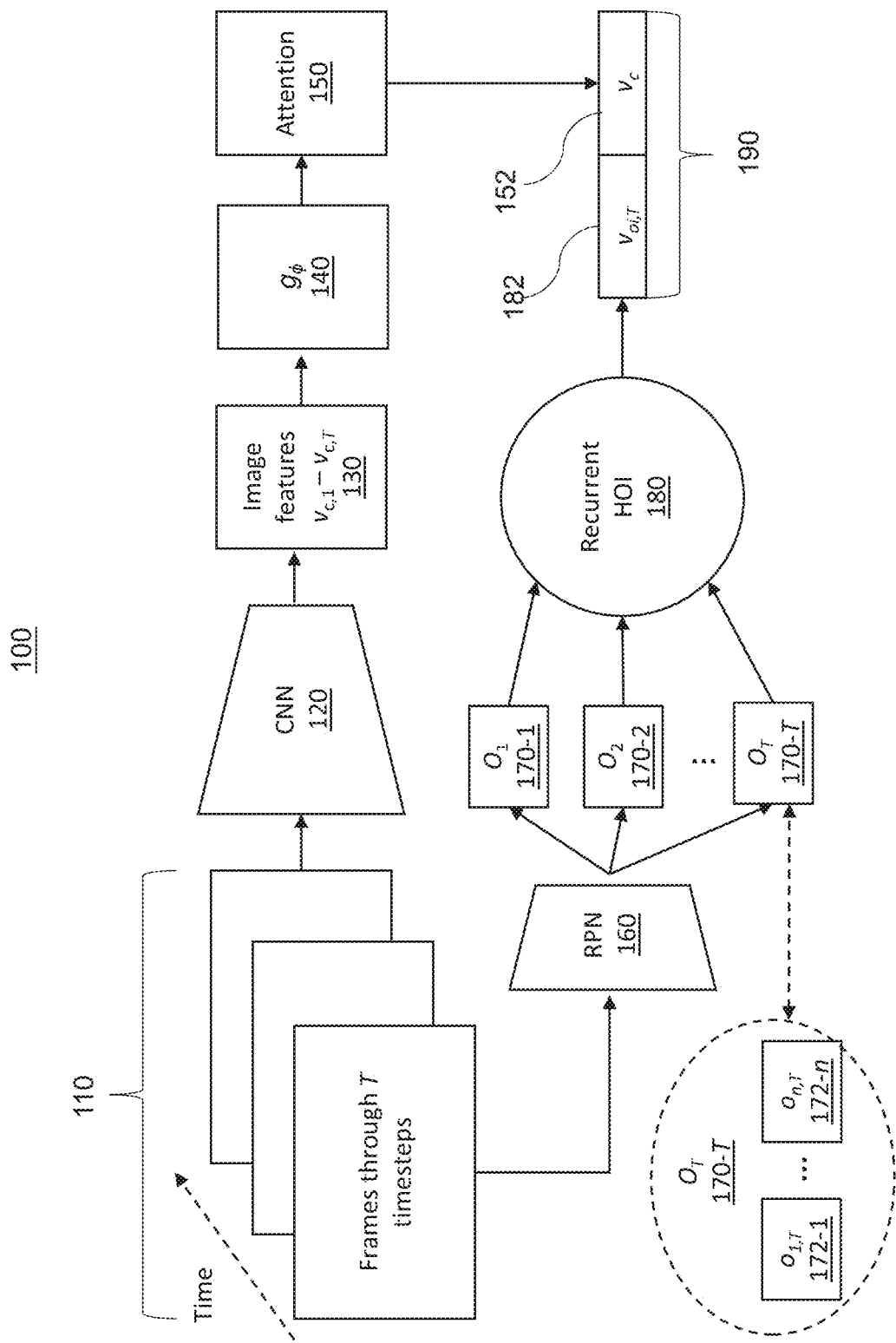
FIG. 1 is a block/flow diagram illustrating an overview of an interaction network for learning object interactions, in accordance with the present principles.

As used herein, the term "object" is defined to be a certain region within an image (e.g., scene or frame of a video) that can be used to determine visual relationships and/or interactions.

Learning relationships between objects in images, such as scenes or frames of videos, can be important for many applications, such as in surveillance, video retrieval, human-machine interaction, video captioning, etc. In the simplest setting, an interaction between objects in a scene can be represented via a summation operation of individual object information. One exemplary method is to add the learnable representations and project these representation into a high-dimensional space, where the object interactions can be exploited by summing up the object representations. Another exemplary approach is to pair all possible object candidates (or subject-object pairs).

When approaches rely on single object representation or pairwise/triplet object relationships, higher-order interactions (HOIs) between objects cannot be learned. HOIs look at an overall scene to get a context of an object in the scene, as well as look at how the scene changes While approaches relying on single object representation or pairwise/triplet object relationships may be suitable for images, videos often contain hundreds or thousands of frames. Thus, learning such object relationships across all objects and all timesteps of a video can be very expensive. Also, instead of using relationships between the objects in their predictions, predictions can be made based on a detection of related objects or background information in the scenes. As a result, such approaches, apart from being non-interpretable, may not be suitable for tasks that require deeper video understanding such as action recognition, video caption generation, scene graph generation, visual question answering, etc. Accordingly, approaches relying on single object representation or pairwise/triplet object relationships are computationally intensive and can be infeasible for very large datasets or for real-time applications that require low feature extraction costs.

To overcome at least the above-noted issues, the embodiments described herein provide for an interaction network that can be used to detect and learn HOIs between objects depicted in videos. The goal is for the interaction network to analyze a video, understand objects in the video, and learn the HOIs between the objects to perform an operation, such as predict an action being depicted in the video (e.g., a person playing basketball), video caption generation, etc.

To do so, the interaction network in accordance with the embodiments described herein can generate two types of representations, referred to herein as a coarse-grained representation and a fine-grained representation. The coarse-grained representation can learn the overall scene, and the fine-grained representation can detect the objects and generate the HOIs.

To generate the coarse-grained representation, the interaction network can illustratively use Scale Dot Product (SDP) attention over image features generated by a convolutional neural network (CNN).

To generate the fine-grained representation, the interaction network can illustratively include a recurrent HOI component that can dynamically select groups of objects with inter-relationships via an attention mechanism, and encode the attended object features. That is, HOIs between arbitrary subgroups of objects can be learned, in which inter-object relationships in one group are detected, and objects with significant relations (e.g., those that serve to improve action recognition, captioning, etc.) can be attentively selected. The combinations of these objects can then be concatenated to model HOIs using, e.g., group to group or triplet groups of objects.

The coarse-grained and fine-grained representations can then be concatenated to generate a concatenated representation for an overall prediction. Accordingly, frame-level information can be discovered by using coarse-to-fine frame-level image features and object features.

The embodiments described herein can combine object features from object detectors that leverage neural networks, such as CNNs and/or fully-convolutional networks (FCNs) (e.g., R-FCN object detectors), that are gated over the image features. From this, the relationships between the objects can be learned by constructing object pairs, and temporal behavior can be learned using a temporal pooling model, such as long short-term memory (LSTM). The features can be extracted by processing a video at a frame rate of, e.g., about 1 frame per second (FPS).

The embodiments described herein can provide for improved accuracy and lower computational cost, as compared to conventional approaches. For example, modeling object interactions in accordance with the embodiments described herein can save over three times the amount of computation as compared to conventional pairwise relationship approaches.

Referring now in detail to the figures in which like numerals represent the same or similar elements, FIG. 1 illustrates an overview of an interaction network 100 in accordance with one embodiment of the present principles.

An input plurality of scenes or frames 110 of a video are provided. The frames 110 can include T frames associated with T timesteps. The frames 110 can be processed by a coarse-grained analysis portion of the network 100 to generate a coarse-grained representation associated with overall image context and a fine-grained analysis portion of the network 100 to generate a fine-grained object representation associated with HOIs in the spatiotemporal domain for general video understanding tasks. As will be described in further detail below, the coarse-grained representations can be generated via attention, such as, e.g., SDP attention, and the fine-grained representations can be generated via a recurrent HOI component. The recurrent HOI component can select groups of objects with inter-relationships via an attention mechanism, and encode attended features of the objects with LSTM. The coarse-grained and fine-grained object representations generated by the coarse-grained analysis and fine-grained analysis portions, respectively, can then be concatenated to form a final prediction.

The coarse-grained analysis portion of the network 100 will now be described in further detail.

The coarse-grained analysis portion of the network 100 includes a CNN component 120, a multilayer perceptron (MLP) component 140 and an attention component 150.

The CNN component 120 receives the frames 110 to generate a representation (or a matrix) that describes what is important in a scene from a visual perspective. For example, as shown, the CNN component 120 generates a sequence of image features 130 corresponding to respective ones of the images, including $v_{c,1}$ through $v_{c,T}$. Each image feature of the sequence 130 can include a feature vector encoded from a corresponding one of the frames 110. For example, each feature vector can have a dimension of, e.g., m=2048.

The sequence of image features 130 is fed into the MLP component 140. An MLP having a parameter $\phi$, referred to herein as $g_\phi$, is a type of feedforward neural network that includes at least three layers of nodes (e.g., an input layer, an output layer and at least one hidden layer).

Illustratively, the MLP component 140 can include two sets of fully-connected layers each with batch normalization and a rectified linear unit (ReLU) employing a rectifier. The MLP component 140 can maintain the same dimension of the input feature vectors 130 (e.g., 2048).

Using LSTM to aggregate a sequence of image representations can result in limited performance since image representations can be similar to each other and, thus, lack temporal variances. Therefore, the outputs of the MLP component 140 are received by the attention component 150 to attend to key image-level representations to summarize the entire video sequence. Generally, attention is performed by generating a linear combination of vectors using attention weights calculated using an attention function. The attention weights can be normalized so that they have a sum of 1 (e.g., applying a SoftMax function).

An example of an SDP attention function that can be utilized in accordance with the embodiments described herein is provided follows:

$$\alpha_c = softmax\left(\frac{X_c^T X_c}{\sqrt{d_\phi}}\right), X_c = g_\phi(V_c) \quad (1)$$

$$v_c = \overline{\alpha_c X_c^T} \quad (2)$$

where $V_c$ is a set including the sequence of image features 130 (e.g., $V_c=\{v_{c,1}, v_{c,2}, \ldots, v_{c,T}\}$, where $v_{c,t} \in \mathbb{R}^m$ is an image feature generated by the CNN component 120 at time t and $1 \leq t \leq T$ for a given video length T), $g_\phi$ is an MLP having a parameter $\phi$, $d_\phi$ is the dimension of the last fully-connected layer of $g_\phi$, $X_c \in \mathbb{R}^{64 \times T}$ is the projected image feature matrix, $\sqrt{d_\phi}$ is a scaling factor, and $\alpha_c \in \mathbb{R}^{T \times T}$ is an attention weight. Accordingly, equation (1) calculates the attention weight based on a projected image feature matrix and a scaling factor, and equation (2) generates attended context information ($v_c$) by mean-pooling the weighted image representations. The attention component 150 outputs the attended context information 152 as a coarse-grained feature representation.

As described above, conventional pairwise object interactions only consider how each object interacts with another object. The embodiments described herein can model inter-relationships between arbitrary subgroups of objects using a fine-grained analysis portion of the network 100, the members of which are determined by a learned attention mechanism.

The fine-grained analysis portion of the network 100 can use object detectors trained to detect regions of interest (ROIs) from the frames 110, and extract information about objects depicted in each of the frames 110 from the ROIs. For example, the network 100 can use recurrent CNN (R-CNN) for object detection, such as e.g., faster R-CNN. In one embodiment, and as shown, the fine-grained analysis portion of the network 100 includes a region proposal network (RPN) component 160 and a recurrent HOI component 180.

The RPN component 160 generates ROI proposals that can be used to detect objects within an image. In one embodiment, the RPN component 160 includes a fully convolutional network (FCN) to generate the ROI proposals. The ROI proposals generated by the RPN component 160 can then be used to obtain sets of object features from each of the frames 110. For example, sets of object features including $O_1$ 170-1, $O_2$ 170-2 and $O_T$ 170-T corresponding to respective ones of the T frames 110 can be obtained by the RPN 160. Set of object features $O_T$ 170-T is illustratively shown having n object features at time T, including $o_{1,T}$ 172-1 through $o_{n,T}$ 172-n. Each object feature can include a feature vector encoded from a corresponding one of the frames 110.

Each set of object features $O_1$ 170-1 through $O_T$ 170-T is fed into the recurrent HOI component 180. The recurrent HOI component 180 can select groups of objects with inter-relationships via an attention mechanism, and encode the attended object features with LSTM. The recurrent HOI component 180 can include one or more MLPs associated with one or more respective attentive selection components. Illustratively, the recurrent HOI component 180 can include n MLPs and corresponding attentive selection components, where $g_{\theta_k}$ represents the k-th MLP. Illustratively, as will be described in further detail below with reference to FIG. 2, the MLP component can include 3 MLPs $g_{\phi_1}$, $g_{\phi_2}$ and $g_{\phi_3}$ and corresponding attentive selection components.

Further details regarding the recurrent HOI component 180 will now be described with reference to FIG. 2.

Figure 2:
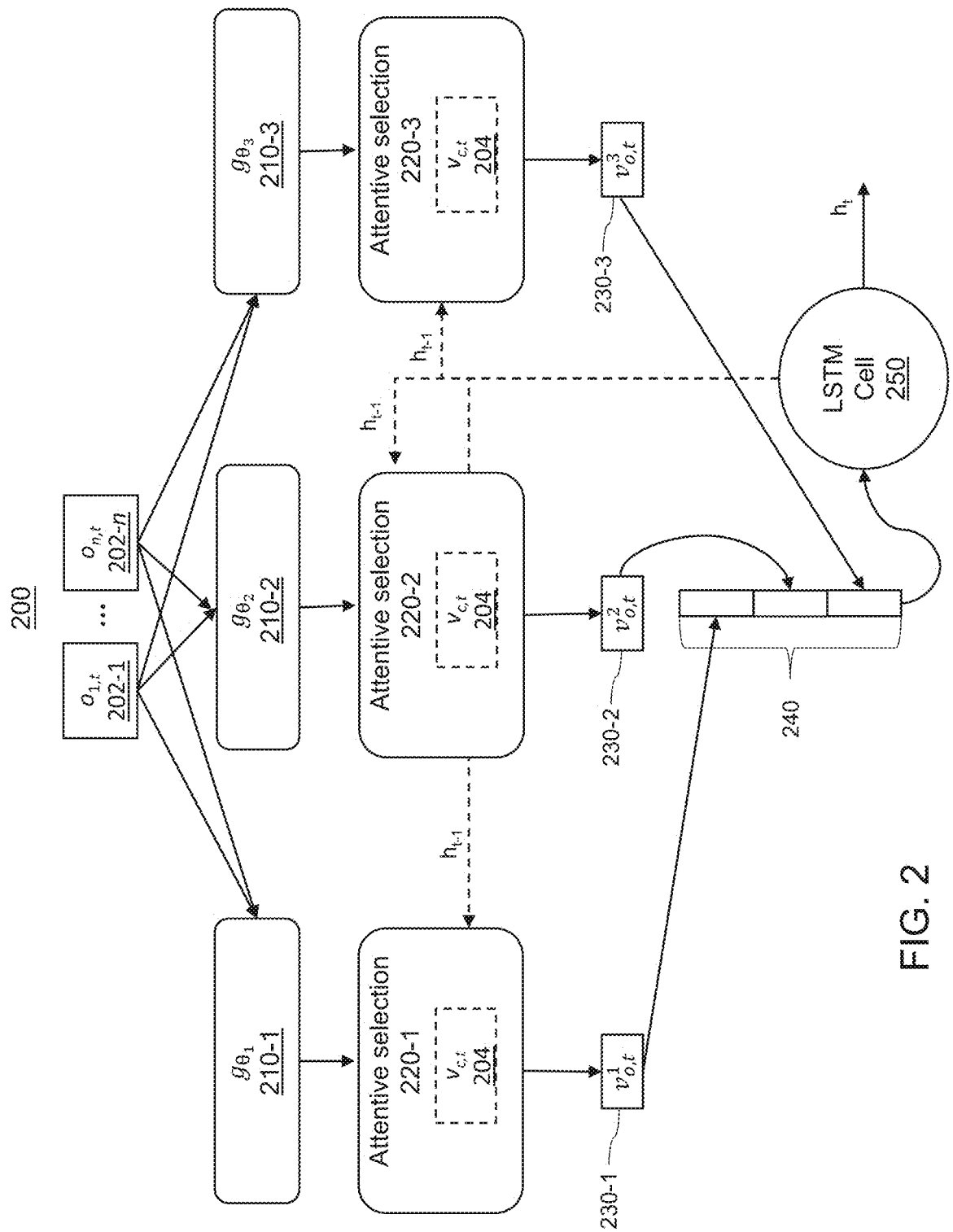
FIG. 2 is a block/flow diagram illustrating a system/method for implementing an exemplary recurrent higher-order interaction (HOI) component of the interaction network of FIG. 1, in accordance with the present principles.

Referring now to FIG. 2, an exemplary recurrent HOI module 200, such as recurrent HOI module 128 in FIG. 1, is illustratively depicted in accordance with one embodiment of the present principles.

Learnable parameters for the incoming object features are introduced via MLP projection, since the object features are pre-trained from another domain and may not necessarily present relevant interactions. For example, the object features can be fed into K MLPs to generate projected object features. The k-th MLP $g_{\theta_k}$ has a corresponding parameter $\theta_k$, which is a learnable synaptic weight shared across all objects and through all timesteps. Illustratively, $g_{\theta_k}$ can include three sets of batch normalization layers, fully-connected layers, and ReLUs.

In the illustrative embodiment of FIG. 2, object features $o_{1,t}$ 202-1 through $o_{n,t}$ 202-n included in a set of object features $O_t$ corresponding to a given timestep t are shown being input into MLP ($g_{\theta_1}$) 210-1 having parameter $\theta_1$, MLP ($g_{74\_2}$) 210-2 having parameter $\theta_2$ and MLP ($g_{\theta_3}$) 210-3 having parameter $\theta_3$, thereby generating projected object features respectively corresponding to the object features 202-1 through 202-n. Accordingly, K=3 in this illustrative embodiment. However, any number of MLPs can be implemented in accordance with the embodiments described herein.

Attention weights can be computed using inputs from current (projected) object features, overall image visual representation, and previously discovered object interactions. For example, the projected object features can be combined with the corresponding (encoded) image feature, shown as $v_{c,t}$ 204, and any previous object interaction(s) to generate k sets of weights to select k groups of objects via attentive selection components, including attentive selection components 220-1 through 220-3. Objects with inter-relationships are selected from an attention weight, which generates a probability distribution over all object candidates. For example, the k-th attention weight $\alpha_k$ corresponding to $g_{\theta_k}$ can be calculated by the k-th attentive selection component as follows:

$$\alpha_k = \text{Attention}(g_{\theta_k}(O_t), v_{c,t}, h_{t-1})$$

where $g_{\phi_k}$ is the k-th MLP having a parameter $\phi_k$, $O_t$ is the set of objects corresponding to timestep t (e.g., $O_t=\{o_{1,t}, o_{2,t}, \ldots, o_{N,t}\}$, where $o_{n,t} \in \mathbb{R}^m$ is the nth object feature representation at timestep t), $v_{c,t}$ is the (encoded) image feature corresponding to timestep t, and $h_{t-1}$ is the previous output of LSTM (memory) cell 250, which represents the previous object interaction representation. Formally, given an input sequence, the LSTM cell 250 computes a hidden vector sequence $h=(h_1, h_2, \ldots, h_T)$ for the T timesteps. Accordingly, an attention weight for a given timestep can be calculated based on a previously discovered object interaction corresponding to the previous timestep, the image feature corresponding to the current timestep, and the set of objects corresponding to the current timestep.

As shown, for a given timestep t, attentive selection component 220-1 outputs a corresponding attended object feature at time t ($v_{o,t}^1$) 230-1, attentive selection component 220-2 outputs a corresponding attended object feature at time t ($v_{o,t}^2$) 230-2, and attentive selection component 220-3 outputs a corresponding attended object feature at time t ($v_{o,t}^3$) 230-3.

Possible attention mechanisms for implementing the attentive selection components 220-1 through 220-3 include dot product attention and α-attention. Dot product attention can be used to model HOIs, which models inter-object relationships in each group of selected objects, since the attention weights computed for each object are the combination of all objects. Unlike, dot product attention, the α-attention mechanism does not consider inter-relationships when selecting the objects. The α-attention mechanism can be used as a baseline to show how consideration the inter-relationships of objects (e.g., using dot product attention) can further improve the accuracy when ROIs are selected separately. Further details regarding implementing dot product attention and α-attention will now be provided with reference to FIG. 3.

Figure 3:
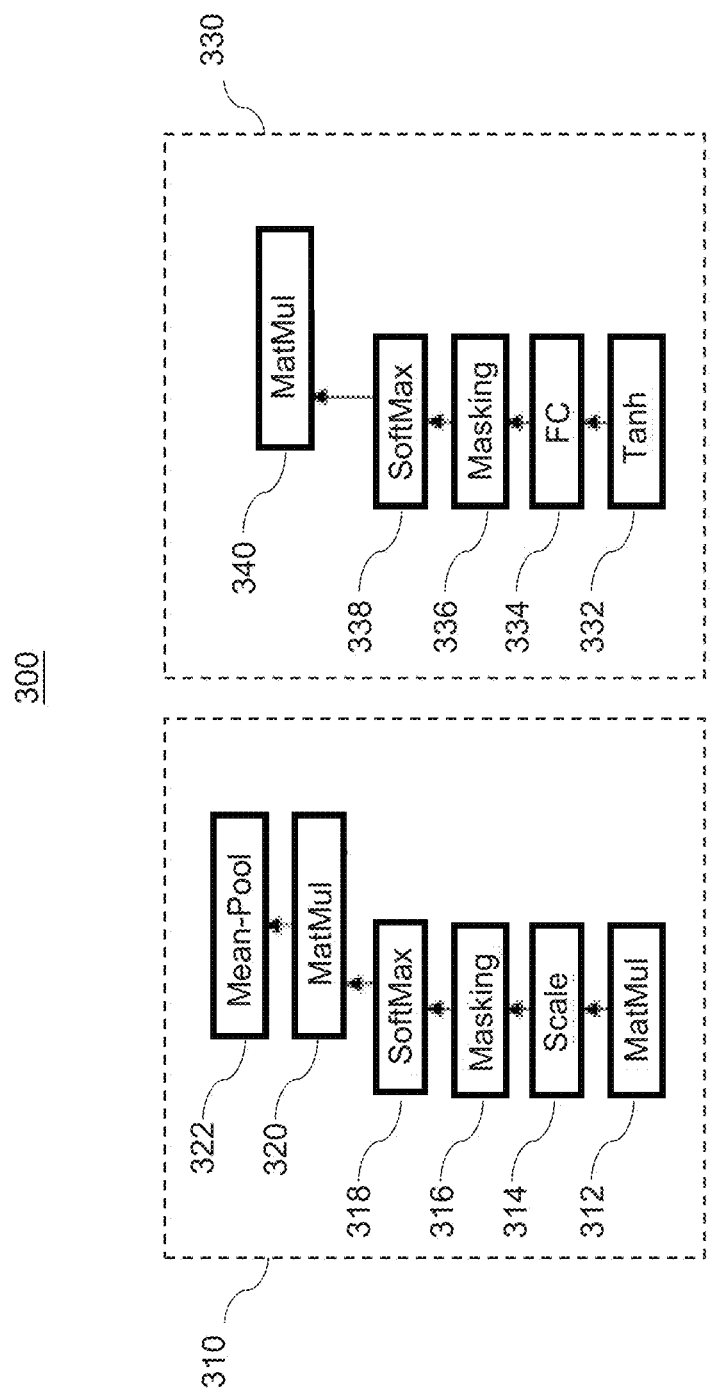
FIG. 3 is a block/flow diagram illustrating a system/method for learning object interactions in an action recognition context, in accordance with the present principles.

Referring to FIG. 3, block/flow diagrams 300 are provided illustrating a dot product attention module 310 for implementing dot product attention and an α-attention module 330 for implementing α-attention.

As shown, the dot product attention module 310 can include a first matrix multiplication (MatMul) layer 312, a scaling layer (Scale) 314, a masking layer 316, SoftMax layer 318, a second MatMul layer 320, and a mean-pooling layer (Mean-Pool) 322.

Current image feature $v_{c,t}$ and previous object interaction representation $h_{t-1}$ can be projected to introduce learnable weights. The projected $v_{c,t}$ and $h_{t-1}$ are then repeated and expanded N times (e.g., the number of objects in $O_t$). This information is combined with projected objects via matrix addition and used as input to the dot product attention. The input to the MatMul layer 312 can be defined as, e.g.:

$$X_k = \text{repeat}(W_{h_k} h_{t-1} + W_{h_k} v_{c,t}) + g_{\theta_k}(O_t)$$

and the k-th attention weight, $\alpha_k$, can be defined using the dot product attention module 310 as, e.g.:

$$\alpha_k = \text{softmax}\left(\frac{X_k^T X_k}{\sqrt{d_\theta}}\right)$$

where $W_{h_k} \in \mathbb{R}^{d_\theta \times d_h}$ and $W_{c_k} \in$ $$W_{c_k} \in \mathbb{R}^{d_\theta \times d_{v_{c,t}}}$$

are learned weights for $v_{c,t}$ and $h_{t-1}$, $d_\theta$ is the dimension of the last fully-connected layer of $g_\theta$, $X_k \in \mathbb{R}^{d_\theta \times N}$ is the input to the k-th attentive selection component, and $\sqrt{d_\phi}$ is a scaling factor. The bias term is omitted in this equation for simplicity, although a bias term can be introduced in other embodiments. An attended object feature at time t, $v_{o,t}^k$, can then calculated for dot product attention as, e.g.:

$$v_{o,t}^k = \overline{\alpha_k (g_{\theta_k}(O_t))^T}$$

where $v_{o,t}^k$ is the k-th attend object feature that encodes the k-th object inter-relationships of a video frame at timestep t. Accordingly, the attended object feature at timestep t can be calculated via dot product attention as a mean-pooling on weighted objects. An additional input to the MatMul layer 320 can be, e.g., $g_{\phi_k}(O_t)$.

The α-attention module 330 can use the same input as the dot product attention module 310 (e.g., $X_k$), but, as shown, the input is sent to a hyperbolic tangent function (tanh) layer 332. As further shown, the α-attention module 330 further includes a fully connected (FC) layer 334, masking layer 336, a SoftMax layer 338, and a MatMul layer 340.

The k-th attention weight, $\alpha_k$, can be defined using the α-attention module 330 as, e.g.:

$$\alpha_k = \text{softmax}(w_k^T \tanh(X_k))$$

where $w_k \in \mathbb{R}^{d_\theta}$ is a learned weight. The k-th attended object feature at time t, $v_{o,t}^k$, can then defined using the α-attention module 330 as, e.g.:

$$v_{o,t}^k = \sum_n \alpha_{k_n}(g_{\theta_k}(o_{n,t}))$$

An additional input to the MatMul layer 340 can be the same as in the additional input to the MatMul layer 320 (e.g., $g_{\phi_k}(O_t)$).

Referring back to FIG. 2, the attended object features 230-1 through 230-3 are concatenated to generate concatenated representation 240, and the concatenated representation 240 is used as an input into the LSTM cell 250 to determine the HOI representation at timestep t ($v_{oi,t}$). That is, $$v_{oi,t} = \text{LSTMCell}(v_{o,t}^1 \| v_{o,t}^2 \| \ldots \| v_{o,t}^K)$$

where $\|$ denotes concatenation. The last hidden state of the LSTM cell 250 (e.g., $h_T = v_{oi,t}$) is selected as the representation of overall object interactions for the entire video sequence.

The dimension of the hidden layers in $g_{\theta_k}$ can be adjusted based on the number of MLPs (K). For example, the dimension of the hidden layers in $g_{\theta_k}$ can have an inverse relationship with K (e.g., the dimension of the hidden layers in $g_{\theta_k}$ can be reduced as K increases). In this way, the input to the LSTM cell 250 can have the same or similar feature dimension. In one embodiment, the hidden dimension of the LSTM cell 250 can be set to the dimension of the image feature vectors (e.g., 2048).

Note that by concatenating selected inter-object relationships into a single HOI representation, each selective attention component tends to select different groups of inter-relationships, since concatenating duplicate inter-relationships does not provide extra information and will be penalized.

Referring back to FIG. 1, the recurrent HOI component 180 outputs the object interactions discovered through the video sequences ($v_{oi,T}$) 182 as a fine-grained feature representation. The outputs $v_c$ 152 and $v_{oi,T}$ 182 can then be concatenated to generate a concatenated feature representation 190. In one embodiment, prior to generating the concatenated feature representation 190, the feature vector can be separately re-normalized with a batch normalization layer. The concatenated feature representation 190 can then be used as input to the last fully-connected layer. Then, the model can be trained to make a final prediction p(y). For example, p(y) can be calculated as follows:

$$p(y) = \text{softmax}(W_p(v_c \| v_{oi,T}) + b_p)$$

where $$W_p \in \mathbb{R}^{d_y \times (d_{v_c} + d_{v_{oi},T})}$$

are learned weights, $b_p \in \mathbb{R}^{d_y}$ are learned biases, and $\|$ denotes concatenation. Accordingly, a combination of the coarse-grained feature representation and the fine-grained feature representation can be used to make a final prediction (e.g., regarding action recognition).

As mentioned, the interaction network described herein can be applied to perform (human) action recognition regarding scenes of a video. The interaction network described herein selectively attends to various regions with relationships and interactions across time. For example, a video frame or scene can have multiple ROIs corresponding to respective bounding box colors. ROIs with the same color can indicate the existence of inter-relationships, and inter-actions between groups of ROIs can be modeled across different colors. The color of each bounding box can be weighted by the attention generated in accordance with the embodiment described herein. Thus, if some ROIs are not important, they can have smaller weights and/or may not be shown on the corresponding image. The same weights can then be used to set the transparent ratio for each ROI. Accordingly, there is a direct relationship between ROI brightness and ROI importance.

The interaction network described herein can focus on the details of a scene and neglect visual content that may be irrelevant (e.g., background information). Furthermore, the interaction network described herein tends to explore an entire frame early in the video (e.g., the attentions tend to be distributed to the ROIs that cover a large portion of the frame), and the attentions become more focused after this exploration stage.

The interaction network described herein can be extended to video captioning applications. The goal in providing fine-grained information for video captioning is that, for each prediction of a word, the model is aware of the past generated word, previous output, and the summary of the video content. At each word generation, the model has the ability to selectively attend to various parts of the video content spatially and temporally, as well as to the detected object interactions.

As will be described in further detail with reference to FIG. 4, video captioning can be employed in accordance with the embodiments described herein using a two-layered LSTM integrated with the coarse-grained and fine-grained representations described above. The two LSTM layers are referred to herein as "Attention LSTM" and "Language LSTM."

Figure 4:
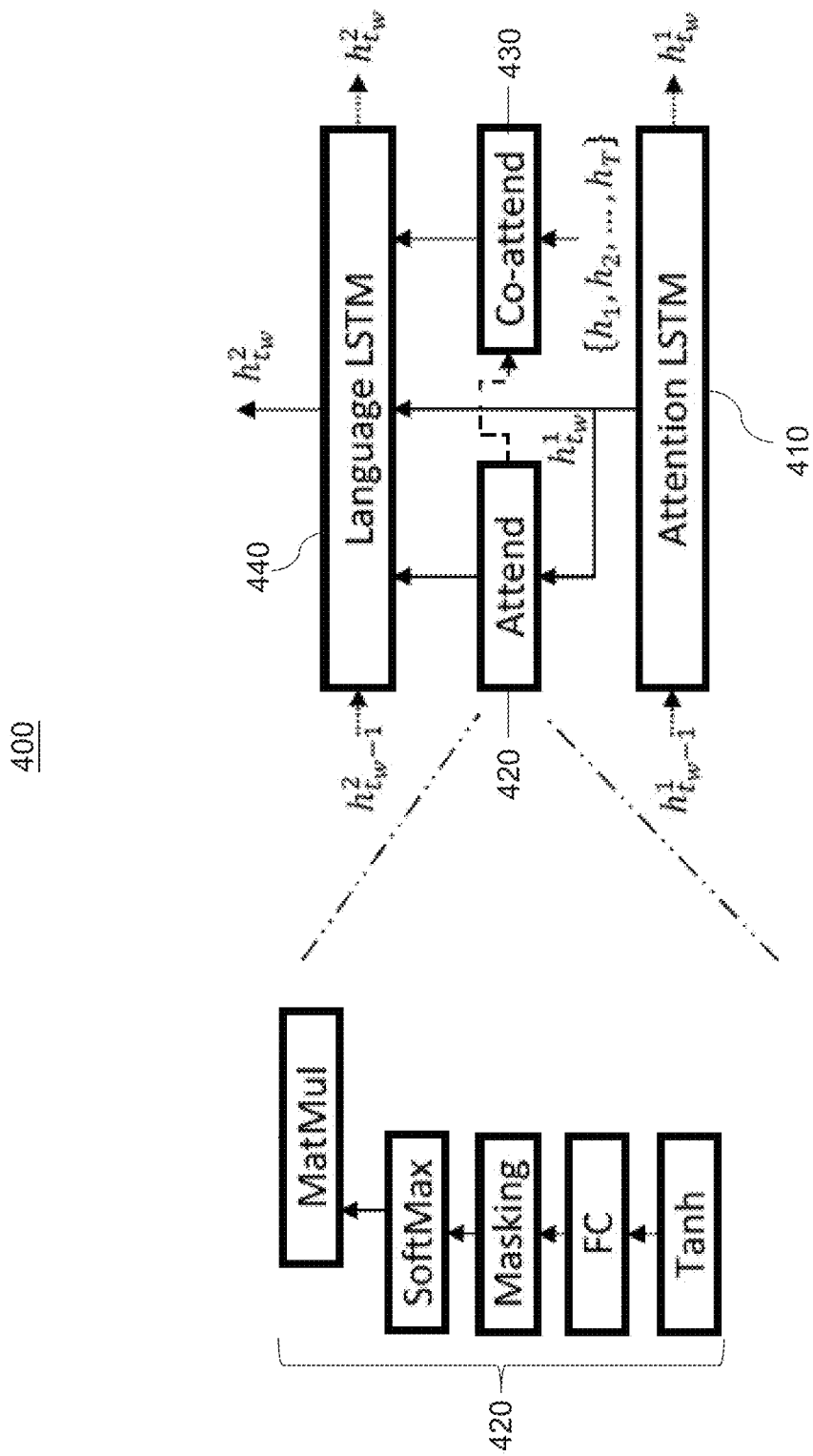
FIG. 4 is a block/flow diagram illustrating a system/method for learning object interactions in a video captioning context, in accordance with the present principles.

Referring to FIG. 4, a system/method 400 for employing video captioning is illustratively depicted in accordance with one embodiment of the present principles. In contrast to prior systems/methods, which applied attention directly over all image patches in an entire video (e.g., attended to objects individually), the system/method 400 attends to object inter-actions while considering their temporal order.

As shown, the system/method 400 includes an attention LSTM layer 410, a temporal attention ("attend") component 420, a co-attention ("co-attend) component 430, and a language LSTM layer 440.

The attention LSTM layer 410 identifies which part of the video in spatio-temporal feature space is needed for the Language LSTM layer 440. To do this, the attention LSTM layer 410 fuses the previous hidden state output of the Language LSTM component 440 ($h_{t_w-1}^2$), the overall representation of the video, and the input word at timestep $t_w-1$ to generate the hidden representation for the attend component 420. For example, the input to the attention LSTM layer 410 ($x_{t_w}^1$) can be defined as:

$$x_{t_w}^1 = h_{t_w-1}^2 \| \overline{g_\phi(V_c)} \| W_e \Pi_{t_w-1}$$

where $g_\phi$ is an MLP having parameter $\phi$, $g_\phi(V_c)$ are the projected image features that are mean-pooled, $W_c$ is a word embedding matrix for a vocabulary of size $\Sigma$, and $\Pi_{t_w-1}$ is a one-hot encoding of the input word at timestep $t_w-1$, where $t_w$ is the timestep for each word generation.

In one embodiment, as shown in FIG. 4, the attend component 420 can adapt α-attention, similar to the α-attention module 330 of FIG. 3, to attend over the projected image features $g_\phi(V_c)$. The attend component 420 uses the output of the Attention LSTM layer 410 ($h_{t_w}^1$) and the projected image features $g_\phi(V_c)$ as input. For example, as shown in FIG. 4, the input to the attend component 420 ($X_a$) can be defined as:

$$X_a = \text{repeat}(W_h^h h_{t_w}^1) + W_c g_\phi(V_c)$$

where $d_\phi$ is the dimension of the last FC layer of $g_\phi$ and $$W_h \in \mathbb{R}^{d_\phi \times d_{h_{t_w}^1}}$$

and $W_c \in \mathbb{R}^{d_\phi \times d_\phi}$ are learned weights for $h_{t_w}^1$ and $g_\phi(V_c)$, respectively. Details regarding the layers of the attend component 420 (e.g., Tanh, FC, Masking, SoftMax, MatMul) are described above with reference to FIG. 3 regarding the layers 332-340 of the α-attention module 330.

The co-attend component 430 can apply the temporal attention obtained from image features to object interaction representations $h=(h_1, h_2, \ldots, h_T)$.

The language LSTM layer 440 receives, as input ($x_{t_w}^2$), a concatenation of the output of the attention LSTM layer 410 ($h_{t_w}^1$), an attended image representation ($\hat{v}_{c,t_w}$) and co-attended object interactions $\hat{h}_{t_w}$ at timestep $t_w$, e.g.:

$$x_{t_w}^2 = h_{t_w}^1 \| \hat{v}_{c,t_w} \| \hat{h}_{t_w}$$

The output of the language LSTM layer 440 ($h_t^2$) can be used to generate each word. In one embodiment, each word is generated by implementing a conditional probability distribution. For example, the conditional probability distribution can be represented by:

$$p(y_{t_w} | y_{1:t_w-1}) = \text{softmax}(W_p h_{t_w}^2)$$

where $y_{1:t_w-1}$ is a sequence of outputs ($y_1, \ldots, y_{t_w-1}$) and $$W_p \in \mathbb{R}^{\Sigma \times d_{h_{t_w}^2}}$$

is a learned weight for $h_t^2$. Bias terms have been omitted for simplicity in this illustrative example.

Figure 5:
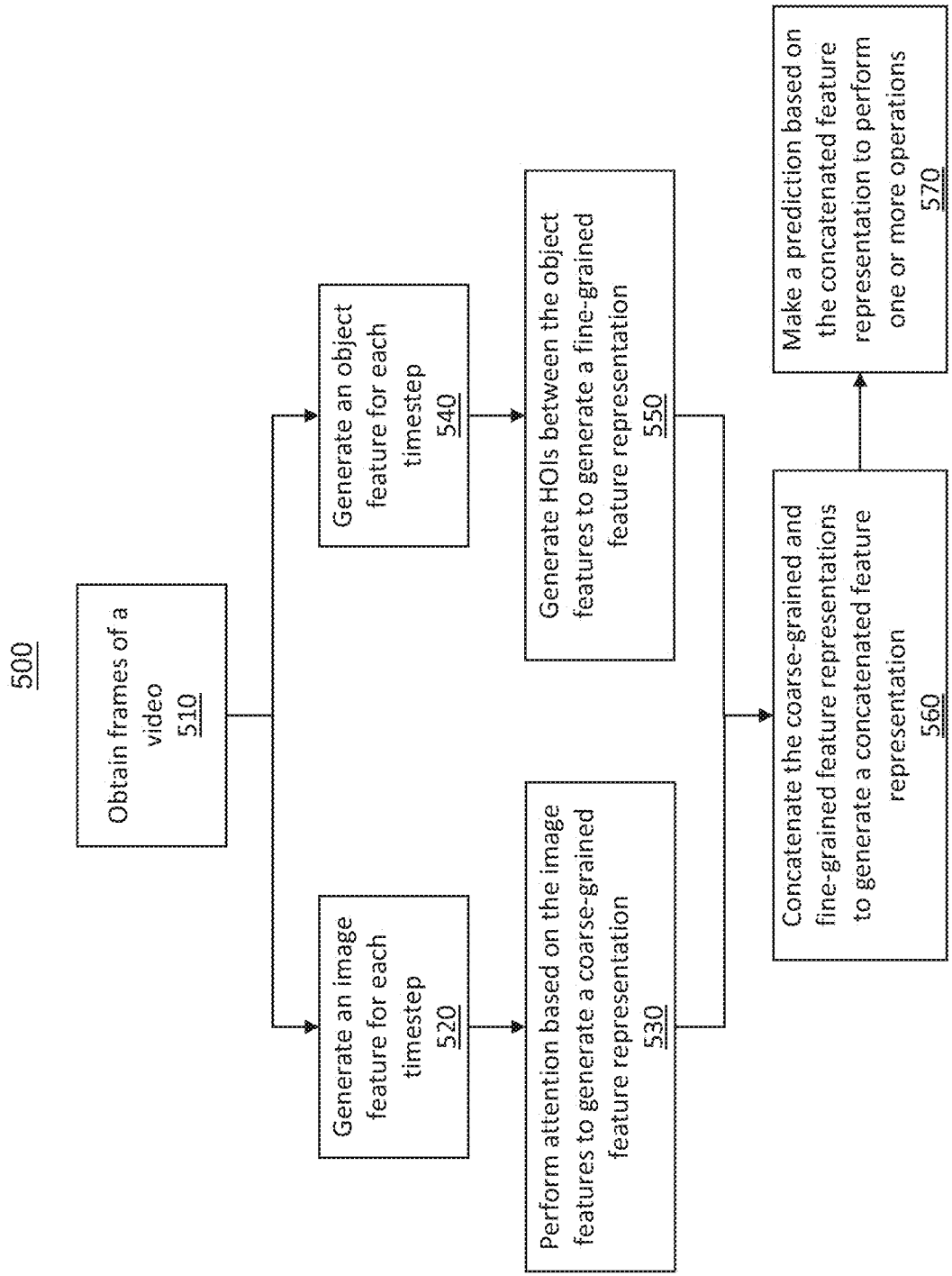
FIG. 5 is a block/flow diagram illustrating a process for implementing an interaction network.

Referring to FIG. 5, a block/flow diagram 500 is provided illustratively depicting a system/method for implementing an interaction network, in accordance with one embodiment of the present principles.

At block 510, frames of a video are obtained. The video can have frames spanning T timesteps.

At block 520, an image feature for each timestep is generated. Each image representation can include a feature vector encoded from a corresponding one of the images. In one embodiment, the image features are generated by employing a CNN.

At block 530, attention is performed based on the image features to generate a coarse-grained feature representation. In one embodiment, performing the attention includes performing SDP attention. The coarse-grained feature representation can include attended context information.

At block 540, an object feature for each timestep is generated. In one embodiment, generating the object features includes generating region proposals, and obtaining the object features (e.g., ROIs) from each of the frames based on the region proposals. The region proposals can be generated using, e.g., an RPN.

At block 550, HOIS between the object features are generated to generate a fine-grained feature representation. The fine-grained feature representation can include objects interactions discovered using recurrent HOI.

At block 560, the coarse-grained and the fine-grained feature representations are concatenated to generate a concatenated feature representation. The concatenated feature representation serves as an input to the last fully-connected layer. In one embodiment, prior to generating the concatenated feature representation, the feature vector can be separately re-normalized with a batch normalization layer.

At block 570, a prediction is made based on the concatenated feature representation to perform one or more operations. The one or more operations can include, for example, action recognition, video captioning, etc.

Further details regarding blocks 510-570 are described above with reference to FIGS. 1-4.

The embodiments described herein provide for more improved floating point operation per second (FLOP) efficiency as compared to conventional object interaction detection systems and methods, thereby improving object interaction detection system performance. Mean-pooling over the object features per frame and using LSTM for temporal reasoning can outperform single compact image representations, the latter of which are the trend for video classification methods. Combining image features with temporal SDP-Attention and object features over LSTM can reach, e.g., 73.1% top-1 accuracy, which can outperform Temporal Segment Networks (TSNs) using a deeper ConvNet with a higher video sampling rate. Beyond using mean-pooling as the simplest form of object interaction, the embodiments described herein for dynamically discovering and modeling HOIs can achieve, e.g., 74.2% top-1 and 91.7% top-5 accuracy.

For example, the following table compares the performance of the interaction network described herein (SINet) as compared to conventional interaction networks:

TABLE 1

| Method | Top-1 | Top-5 | FLOP ($e^9$) |
|---|---|---|---|
| Obj (mean-pooling) | 73.1 | 90.8 | 1.9 |
| Obj pairs (mean-pooling) | 73.4 | 90.8 | 18.3 |
| Obj triplet (mean-pooling) | 72.9 | 90.7 | 77.0 |
| SINet (K = 1) | 73.9 | 91.3 | 2.7 |
| SINet (K = 2) | 74.2 | 91.5 | 5.3 |
| SINet (K = 3) | 74.2 | 91.7 | 8.0 |

As shown in Table 1, the SINet can achieve pair-wise interaction (K=2) performance corresponding to around 5.3 gigaFLOPs (GLOPS) and third-order interaction (K=3) performance corresponding to around 8.0 GFLOPs. In contrast, conventional object interaction detection systems and methods can achieve pair-wise interaction performance corresponding to around 18.3 GFLOPs and can achieve third-order interaction performance corresponding to around 77 GFLOPs.

Embodiments described herein may be entirely hardware, entirely software or including both hardware and software elements. In a preferred embodiment, aspects of the present invention are implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
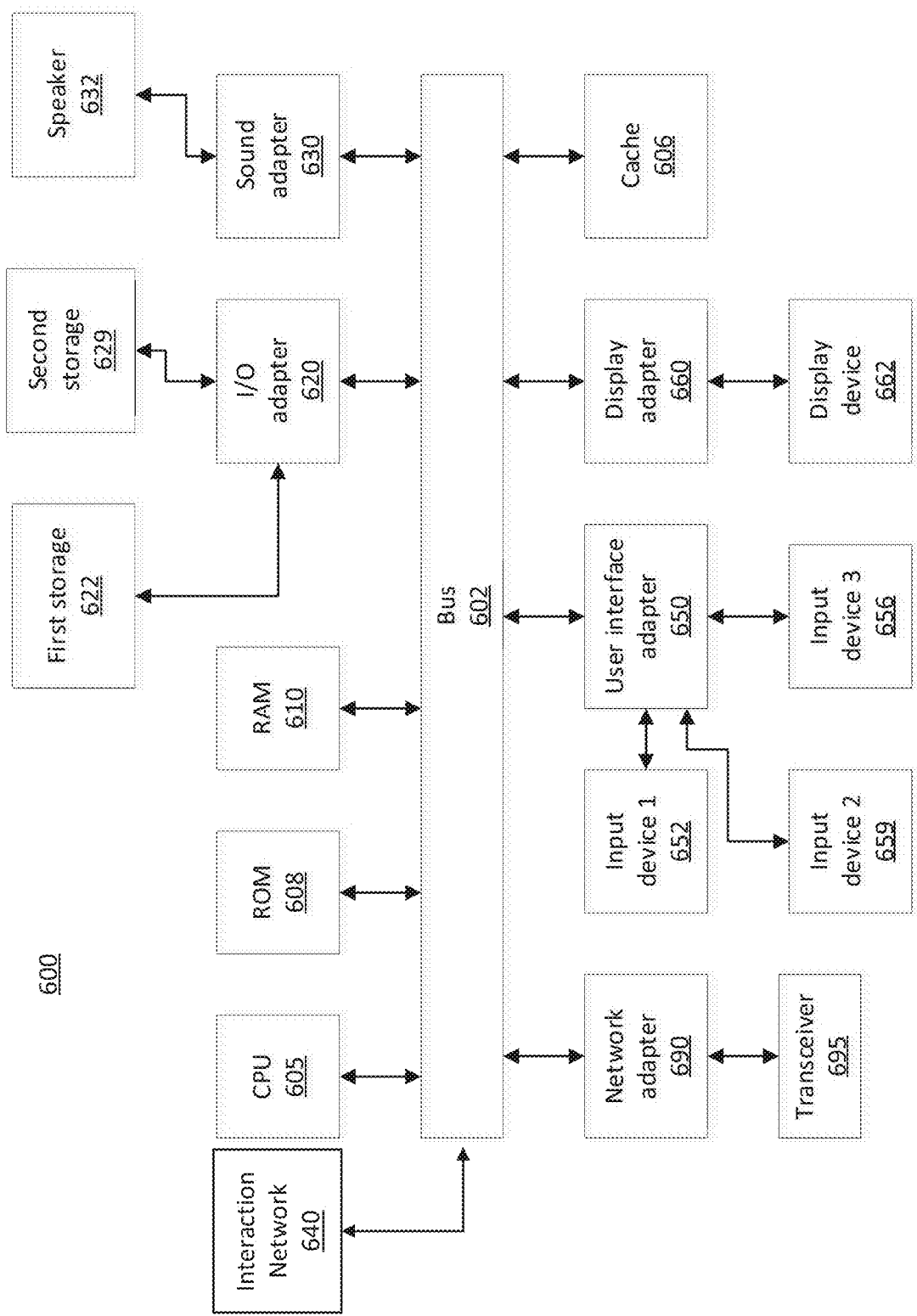
FIG. 6 is a block/flow diagram illustrating a computer system for learning object interactions, in accordance with the present principles.

Referring now to FIG. 6, an exemplary computer system 600 is shown which may represent a server or a network device, in accordance with an embodiment of the present invention. The computer system 600 includes at least one processor (CPU) 605 operatively coupled to other components via a system bus 602. A cache 606, a Read Only Memory (ROM) 608, a Random-Access Memory (RAM) 610, an input/output (I/O) adapter 620, a sound adapter 630, a network adapter 690, a user interface adapter 650, and a display adapter 660, are operatively coupled to the system bus 602.

A first storage device 622 and a second storage device 629 are operatively coupled to system bus 602 by the I/O adapter 620. The storage devices 622 and 629 can be any of a disk storage device (e.g., a magnetic or optical disk storage device), a solid state magnetic device, and so forth. The storage devices 622 and 629 can be the same type of storage device or different types of storage devices.

A speaker 632 may be operatively coupled to system bus 602 by the sound adapter 630. A transceiver 695 is operatively coupled to system bus 602 by network adapter 690. A display device 662 is operatively coupled to system bus 602 by display adapter 660.

A first user input device 652, a second user input device 659, and a third user input device 656 are operatively coupled to system bus 602 by user interface adapter 650. The user input devices 652, 659, and 656 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 652, 659, and 656 can be the same type of user input device or different types of user input devices. The user input devices 652, 659, and 656 are used to input and output information to and from system 600.

An interaction network 640 is illustratively shown operatively coupled to the system bus 602. The interaction network 640 is configured to perform the operations described above with reference to FIGS. 1-5. The interaction network 640 can be implemented as a standalone special purpose hardware device, or may be implemented as software stored on a storage device. In the embodiment in which the interaction network 640 is software-implemented, although the interaction network 640 is shown as a separate component of the computer system 600, the interaction network 640 can be stored on the first storage device 622 and/or the second storage device 629. Alternatively, the interaction network 640 can be stored on a separate storage device (not shown).

Of course, the computer system 600 may also include other elements (not shown), as readily contemplated by one of skill in the art, as well as omit certain elements. For example, various other input devices and/or output devices can be included in computer system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 600 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for improving video understanding tasks based on higher-order object interactions (HOIs) between object features, comprising:
   obtaining a plurality of frames of a video;
   generating a coarse-grained feature representation, including generating an image feature for each of a plurality of timesteps respectively corresponding to each of the frames, and performing attention based on the image features;
   generating a fine-grained feature representation, including generating an object feature for each of the plurality of timesteps, and generating the HOIs between the object features; and
   concatenating the coarse-grained and the fine-grained feature representations to generate a concatenated feature representation.

2. The method of claim 1, further comprising making a prediction based on the concatenated feature representation to perform one or more operations.

3. The method of claim 2, wherein the one or more operations include at least one of action recognition and video captioning.

4. The method of claim 1, wherein the image features are generated using a convolutional neural network (CNN).

5. The method of claim 1, wherein performing attention based on the image features further includes performing Scaled Dot Product (SDP) attention.

6. The method of claim 1, wherein the coarse-grained feature representation includes attended context information.

7. The method of claim 6, wherein generating the coarse-grained feature representation further comprises generating the attended context information by mean-pooling weighted image representations.

8. The method of claim 1, wherein the object features are generated using a region proposal network (RPN).

9. The method of claim 1, wherein generating the HOIs further includes:
   generating projected object features respectively corresponding to the object features;
   computing attention weights based at least in part on the projected object features;
   performing attentive selection using a plurality of attentive selection components to generate attended object features each corresponding to a respective one of the attentive selection components;
   concatenating the attended object features to generate an attended object feature representation; and
   determining an HOI representation based on the attended object feature representation.

10. The method of claim 9, wherein the projected object features are generated using a plurality of multilayer perceptrons (MLPs).

11. The method of claim 9, wherein the attentive selection components implement dot product attention.

12. The method of claim 9, wherein determining the HOI representation further includes implementing a long short term memory (LSTM) cell, and wherein a last hidden state of the LSTM cell is selected as the HOI representation.

13. A computer program product comprising a non-transitory computer readable storage medium having program instructions embodied therewith, the program instructions executable by a computer to cause the computer to perform a method for improving video understanding tasks based on higher-order object interactions (HOIs) between object features comprising:

obtaining a plurality of frames of a video;

generating a coarse-grained feature representation, including generating an image feature for each of a plurality of timesteps respectively corresponding to each of the frames, and performing attention based on the image features;

generating a fine-grained feature representation, including generating an object feature for each of the plurality of timesteps, and generating the HOIs between the object features; and concatenating the coarse-grained and the fine-grained feature representations to generate a concatenated feature representation.

14. The computer program product of claim 13, wherein the method further comprises making a prediction based on the concatenated feature representation to perform one or more operations, and wherein the one or more operations include at least one of action recognition and video captioning.

15. The computer program product of claim 13, wherein the image features are generated using a convolutional neural network (CNN).

16. The computer program product of claim 13, wherein performing attention based on the image features further includes performing Scaled Dot Product (SDP) attention.

17. The computer program product of claim 13, wherein the coarse-grained feature representation includes attended context information, and wherein generating the coarse-grained feature representation further comprises generating the attended context information by mean-pooling weighted image representations.

18. The computer program product of claim 13, wherein generating the HOIs further includes:

generating projected object features respectively corresponding to the object features;

computing attention weights based at least in part on the projected object features;

performing attentive selection using a plurality of attentive selection components to generate attended object features each corresponding to a respective one of the attentive selection components;

concatenating the attended object features to generate an attended object feature representation; and determining an HOI representation based on the attended object feature representation.

19. The computer program product of claim 18, wherein determining the HOI representation further includes implementing a long short term memory (LSTM) cell, and wherein a last hidden state of the LSTM cell is selected as the HOI representation.

20. A system for improving video understanding tasks based on higher-order object interactions (HOIs) between object features, comprising:

at least one processor operatively coupled to a memory, wherein the at least one processor is configured to:

obtain a plurality of frames of a video;

generate a coarse-grained feature representation by generating an image feature for each of a plurality of timesteps respectively corresponding to each of the frames, and performing attention based on the image features;

generate a fine-grained feature representation by generating an object feature for each of the plurality of timesteps, and generating the HOIs between the object features; and concatenate the coarse-grained and the fine-grained feature representations to generate a concatenated feature representation.

\* \* \* \* \*